(12) United States Patent
Iorgovan

(10) Patent No.: US 9,174,579 B2
(45) Date of Patent: Nov. 3, 2015

(54) RUNNING BOARD BRACKET

(71) Applicant: Salflex Polymers Limited, Weston (CA)

(72) Inventor: Peter Iorgovan, Etobicoke (CA)

(73) Assignee: Salflex Polymers Limited, Weston, ON (CA)

( * ) Notice: Subject to any disclaimer, the term of this patent is extended or adjusted under 35 U.S.C. 154(b) by 0 days.

(21) Appl. No.: 14/358,591

(22) PCT Filed: Nov. 14, 2012

(86) PCT No.: PCT/CA2012/001047
§ 371 (c)(1),
(2) Date: May 15, 2014

(87) PCT Pub. No.: WO2013/071407
PCT Pub. Date: May 23, 2013

(65) Prior Publication Data
US 2014/0327222 A1    Nov. 6, 2014

Related U.S. Application Data

(60) Provisional application No. 61/560,372, filed on Nov. 16, 2011.

(51) Int. Cl.
*B60R 3/00*          (2006.01)

(52) U.S. Cl.
CPC ..................................... *B60R 3/002* (2013.01)

(58) Field of Classification Search
CPC ............ B60R 3/00; B60R 3/002; B60R 3/007
USPC ................................ 280/163, 164.1, 169, 165
See application file for complete search history.

(56) References Cited

U.S. PATENT DOCUMENTS

| | | | |
|---|---|---|---|
| 6,533,302 B2 * | 3/2003 | Scruggs et al. | 280/163 |
| 6,959,937 B2 | 11/2005 | Schneider et al. | |
| D521,439 S | 5/2006 | Chapman et al. | |
| 7,083,179 B2 * | 8/2006 | Chapman et al. | 280/163 |
| 7,311,320 B2 | 12/2007 | Kuntze et al. | |
| 7,334,807 B2 * | 2/2008 | Mulder et al. | 280/163 |
| 7,513,518 B1 * | 4/2009 | Mayville et al. | 280/163 |
| 7,677,583 B2 | 3/2010 | Armstrong et al. | |
| 8,016,309 B2 | 9/2011 | Flajnik et al. | |
| 8,403,348 B1 * | 3/2013 | Wang | 280/163 |
| 8,657,318 B2 * | 2/2014 | Chen | 280/163 |
| 2007/0085376 A1 * | 4/2007 | Kuntze et al. | 296/163 |
| 2007/0126201 A1 * | 6/2007 | Crandall | 280/163 |

FOREIGN PATENT DOCUMENTS

CA          2465249      12/2004

* cited by examiner

*Primary Examiner* — Hau Phan
(74) *Attorney, Agent, or Firm* — Medler Ferro PLLC

(57) ABSTRACT

A bracket for mounting a running board to a vehicle. The bracket comprising a main body comprising a support surface, an interlock structure and a mount element. The support surface provides a surface for supporting the running board. The interlock structure provides a mechanical engagement with a lower flange of the vehicle. The mount element cooperates with a fastener for fastening the bracket to a structural panel of the vehicle.

20 Claims, 13 Drawing Sheets

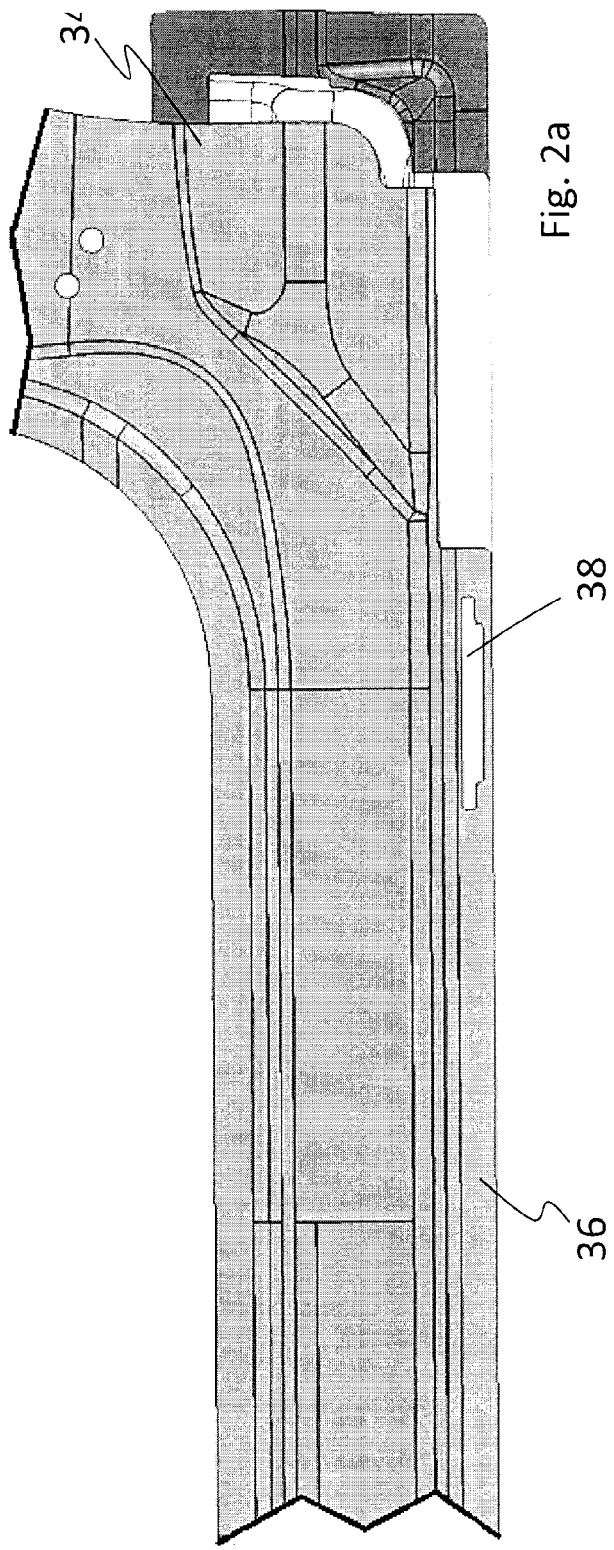
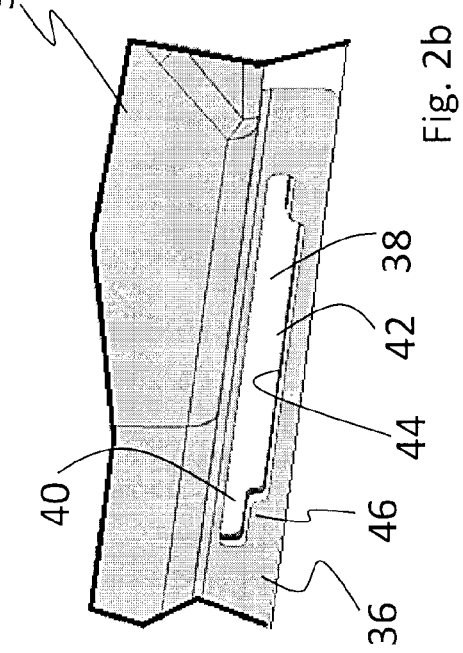
Fig. 2a
Fig. 2b

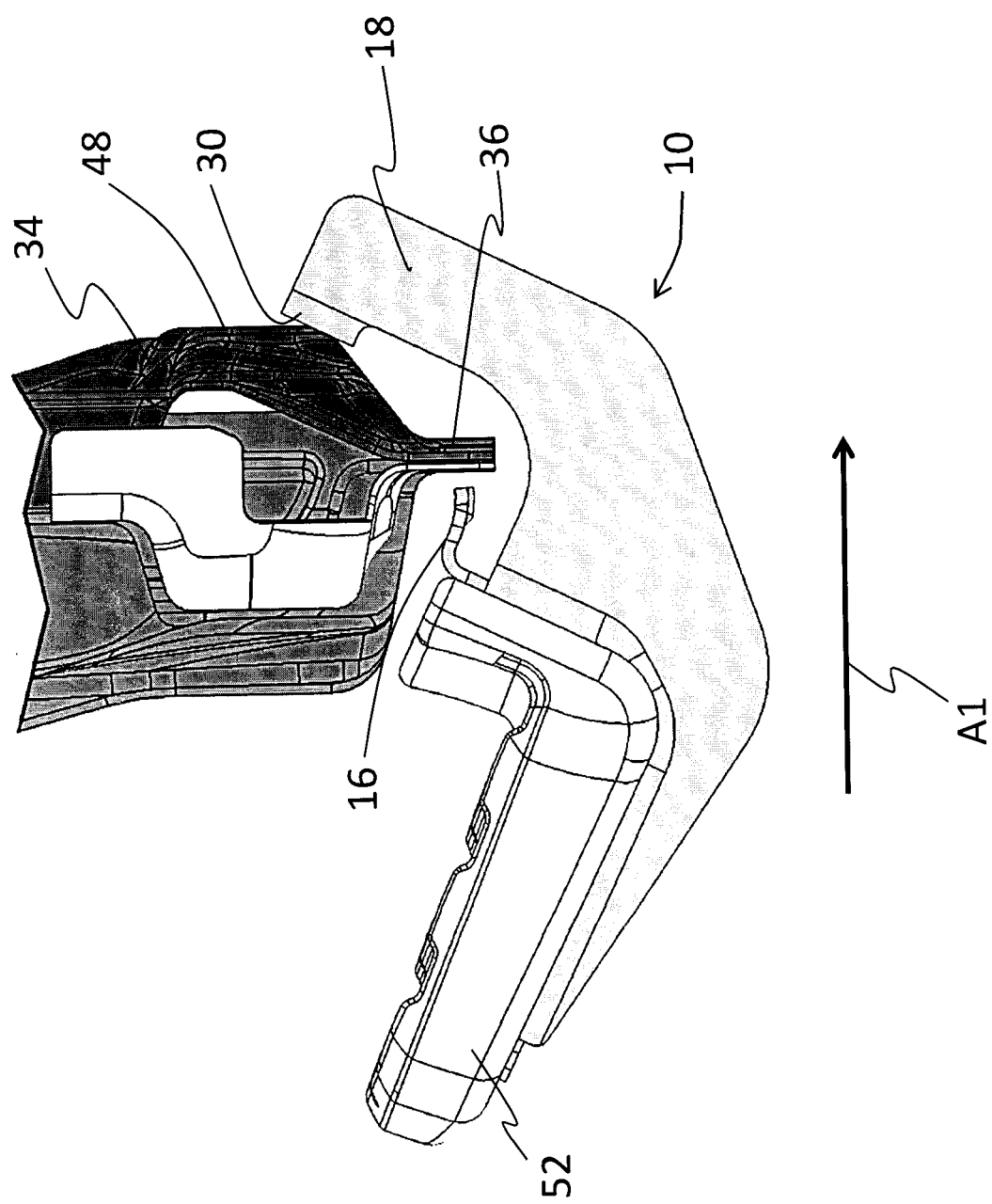

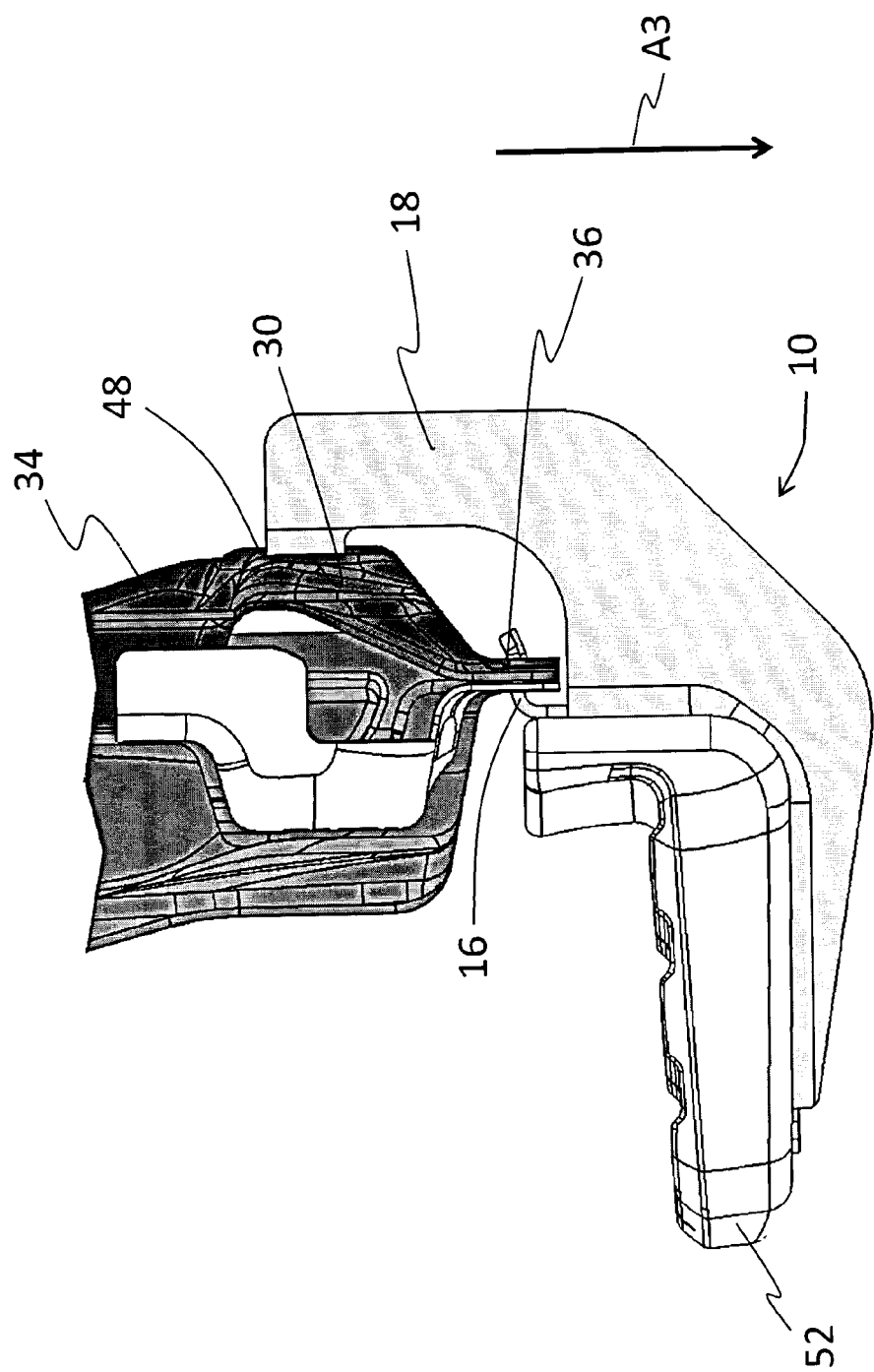

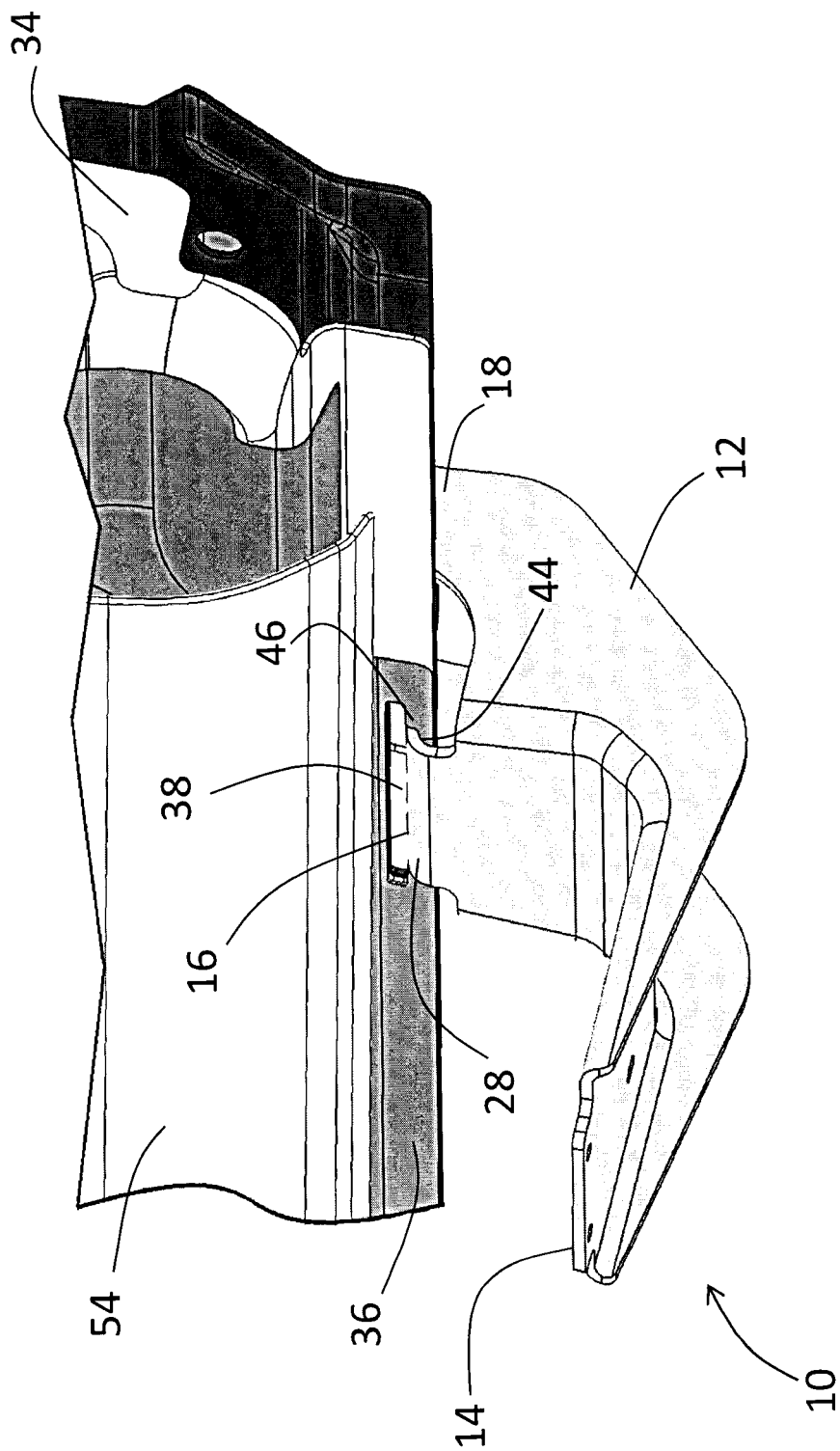

RUNNING BOARD BRACKET

FIELD OF THE INVENTION

The present invention relates to vehicle running boards. More specifically, the present invention relates to a bracket system for mounting a running board to a vehicle.

BACKGROUND OF THE INVENTION

Running boards or assist steps, are often mounted on vehicles for assisting the user to climb into and out of the vehicle. Such running boards also have decorative function and are often added as an accessory either as part of an original installation or as part of an aftermarket installation to add to the vehicle aesthetics.

One such running board is illustrated in Applicant's U.S. Pat. No. 8,016,309 (issued Sep. 13, 2011), the contents of which are incorporated by reference. U.S. Pat. No. 8,016,309 details a running board assembly for mounting to a vehicle such as a truck, the assembly including an extruded running board body and a cover member. The extruded running board body is made from an extrudable plastic and the cover member is made of a material having the desired exterior finish. The cover member may be metallic and have the appearance of a chrome or polished finish. The cover extends over the upper and outboard surface of the running board body to provide the desired appearance characteristics. As generally known in the art, running boards of this and other designs are affixed to the vehicle using one or more mounting brackets.

SUMMARY OF THE INVENTION

According to an aspect of an embodiment, provided is a bracket for mounting a running board to a vehicle, the bracket comprising a main body comprising a support surface, an interlock structure and a mount element. The support surface provides a surface for supporting the running board. The interlock structure provides a mechanical engagement with a lower flange of the vehicle. The mount element cooperates with a fastener for fastening the bracket to a structural panel of the vehicle.

According to another aspect of an embodiment, provided is a running board assembly for use on a vehicle, the running board assembly comprising a running board, and at least one bracket mounted to the running board. The bracket is configured for mounting the running board to the vehicle. The bracket comprises a main body comprising a support surface, an interlock structure and a mount element. The support surface provides a surface for supporting the running board. The interlock structure provides a mechanical engagement with a lower flange of the vehicle. The mount element is configured to enable fastening of the bracket to a structural panel of the vehicle.

According to a further aspect of an embodiment, provided is a bracket for mounting a running board to a vehicle, the bracket comprising a main body comprising a support surface, an interlock structure and a mount element. The support surface provides a surface for supporting the running board. The interlock structure provides a mechanical engagement with a lower flange of the vehicle. The mount element is configured to enable fastening of the bracket to a structural panel of the vehicle.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale, and the directions indicated are relative to the bracket.

FIG. 1b is a rear view of the bracket of FIG. 1a.

FIG. 2a is a side view of a portion of a vehicle structural panel defining a receiving surface for the bracket of FIG. 1a.

FIG. 2b is an enlarged perspective view of the receiving surface for the bracket of FIG. 1a.

FIGS. 3a to 3d show in sequence the installation of the bracket of FIG. 1a on a vehicle structural panel.

FIG. 4 is a perspective view of the bracket of FIG. 1a installed on a vehicle.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology with respect to mounting running boards on vehicles such as trucks, the invention may also be used for mounting running boards on other vehicles types, as well as for mounting step surfaces on non-automotive structures. Furthermore, there is no intention to be bound by any expressed or implied theory presented in the preceding technical field, background, brief summary or the following detailed description.

Figure 1A:
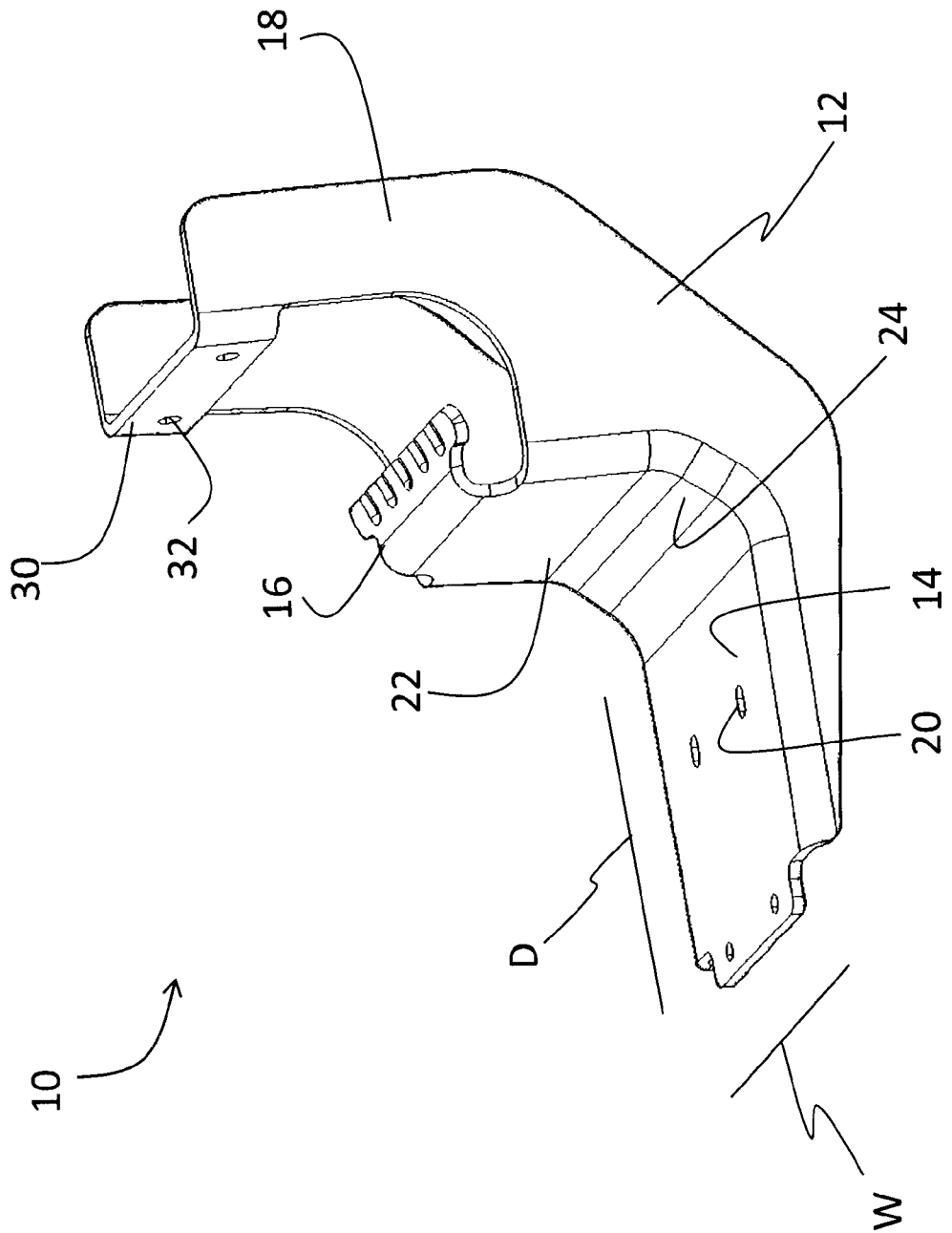
FIG. 1a is a perspective view of a bracket according to an embodiment of the invention.
Figure 1B:
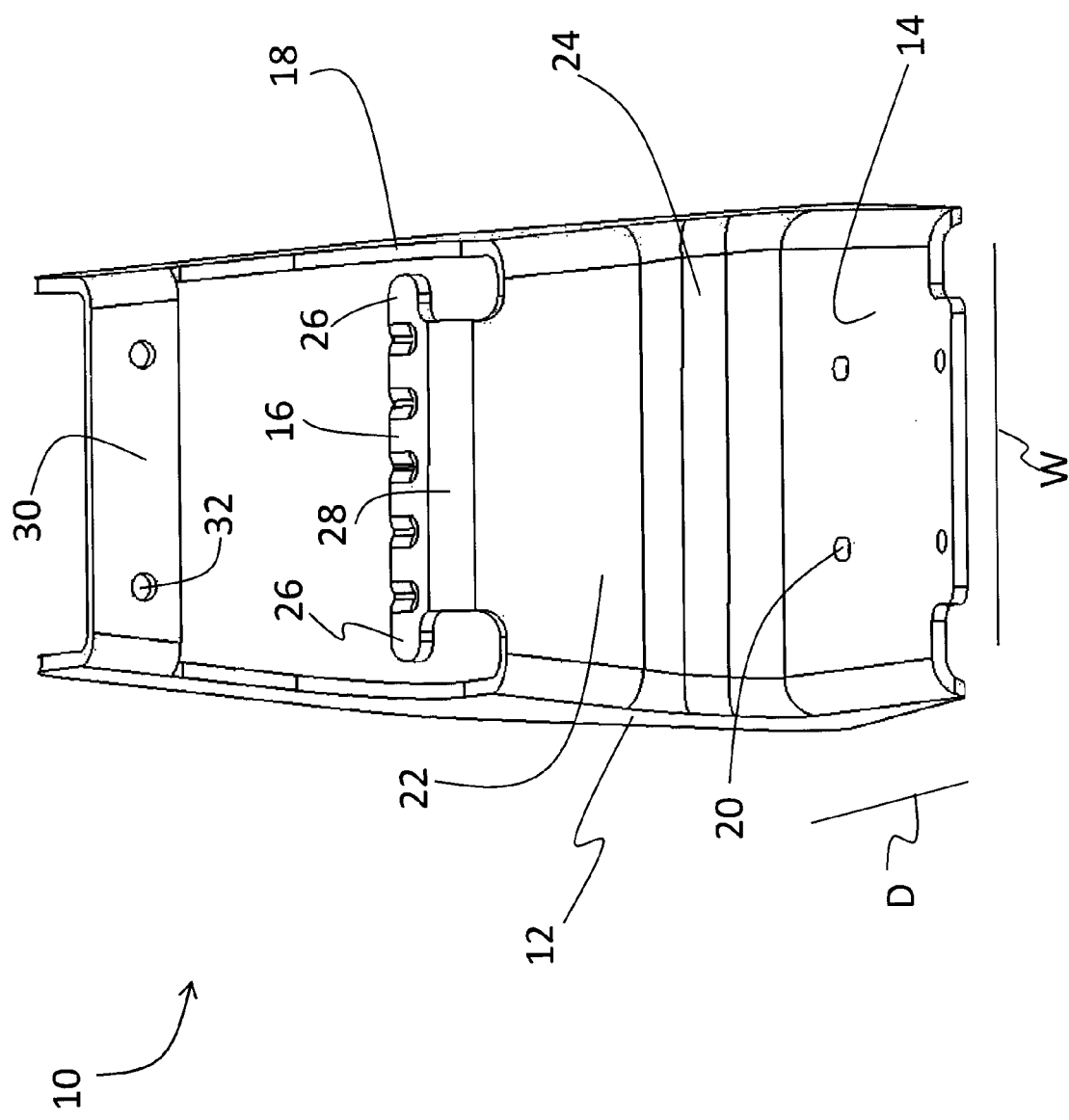

Turning now to FIGS. 1a and 1b, shown is a bracket 10 for mounting a running board to a vehicle. Bracket 10 comprises a generally L-shaped main body 12 having a support surface 14 for receiving the running board. Main body 12 also comprises an interlock structure 16 for mechanical engagement with the vehicle, as well as an extension arm 18 configured to cooperate with fasteners for fastening bracket 10 to the vehicle. As shown, support surface 14 forms a first portion of the L-shaped main body, extension arm 18 forms a second portion of the L-shaped main body, and interlock structure 16 is located generally in the region of the transition between the first and second portions of the L-shaped main body.

The width W of bracket 10 and the depth D provided by support surface 14 is selected based on specific desired performance characteristics, such as maximum load supportable by the running board. As such, it will be appreciated that a range of widths W and depths D may be implemented depending on the intended function of the running board. Support surface 14 is generally planar, but may incorporate additional features such as projections (not shown) that cooperate with the running board to ensure proper fit and finish. Support surface 14 provides at least one aperture 20, through which suitable fasteners are used to fasten the running board to bracket 10. In the embodiment shown, four apertures 20 are provided in support surface 14. Bracket 10 may also provide a support wall 22 to further support the running board. As shown bracket 10 provides a curved transition 24 from support surface 14 to support wall 22. As will be appreciated, the transition from support surface 14 to support wall 22 may be configured in a variety of ways, depending on the design characteristics of the running board to be mounted.

Interlock structure 16 is configured to cooperate with an interlock aperture provided on the vehicle, as will be described in greater detail below. As seen more clearly in FIG. 1b, interlock structure 16 is generally a T-shaped extension, with a pair of engagement wings 26 on opposite sides of central stem 28.

Extension arm 18 cooperates with suitable fasteners to fasten bracket 10 to the vehicle. Extension arm 18 provides a mount element 30 configured with at least one aperture 32 for receiving a fastener. In the embodiment shown, mount element 30 provides two apertures 32 for receiving fasteners.

Turning now to FIGS. 2a and 2b, shown is an exemplary receiving surface on a vehicle for receiving bracket 10. In the view shown, provided is a structural panel 34 defining a portion of the overall vehicle frame structure. In the embodiment shown, structural panel 34 is comprised of a plurality of structural members. As will be appreciated, the exact configuration of structural panel 34 will vary from vehicle to vehicle, with fewer or greater numbers of structural members being used to define structural panel 34. In general, however, structural panel 34 provides a lower flange 36 along its bottom edge. Lower flange 36 is configured with an interlock aperture 38 at each of the mount locations of bracket 10. Interlock aperture 38 is configured as a T-shaped opening, having a dimension suitable to receive interlock structure 16 of bracket 10. More specifically, interlock aperture 38 provides an upper installation opening 40 having a width suitable to receive the engagement wings 26 of the T-shaped interlock structure 16. Interlock aperture 38 also provides a lower opening 42 defined by seat 44 and lock shoulders 46, lock shoulders 46 cooperating with engagement wings 26 of interlock structure 16 to retain interlock structure 16 therein.

Figure 3B:
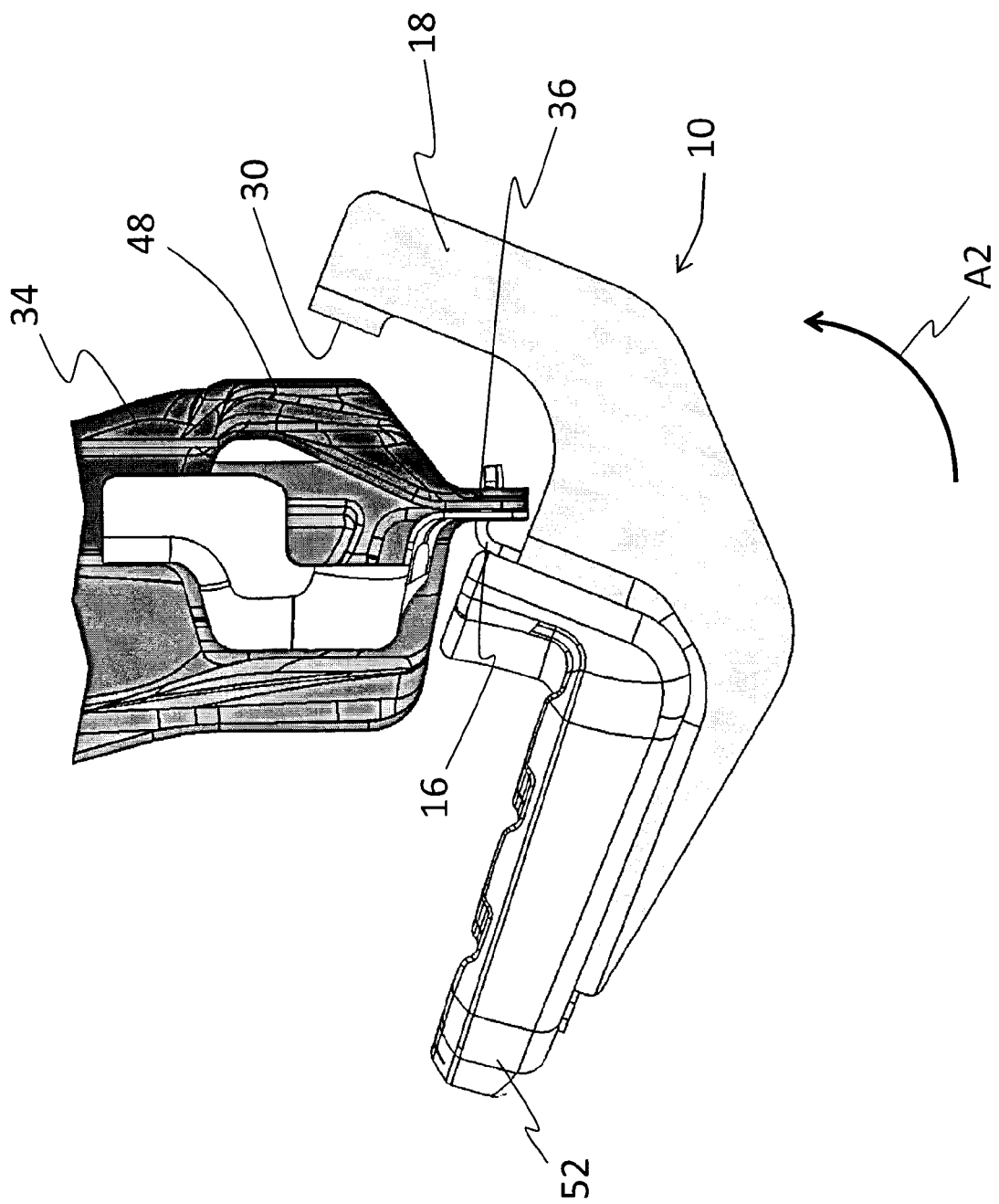
Figure 3D:
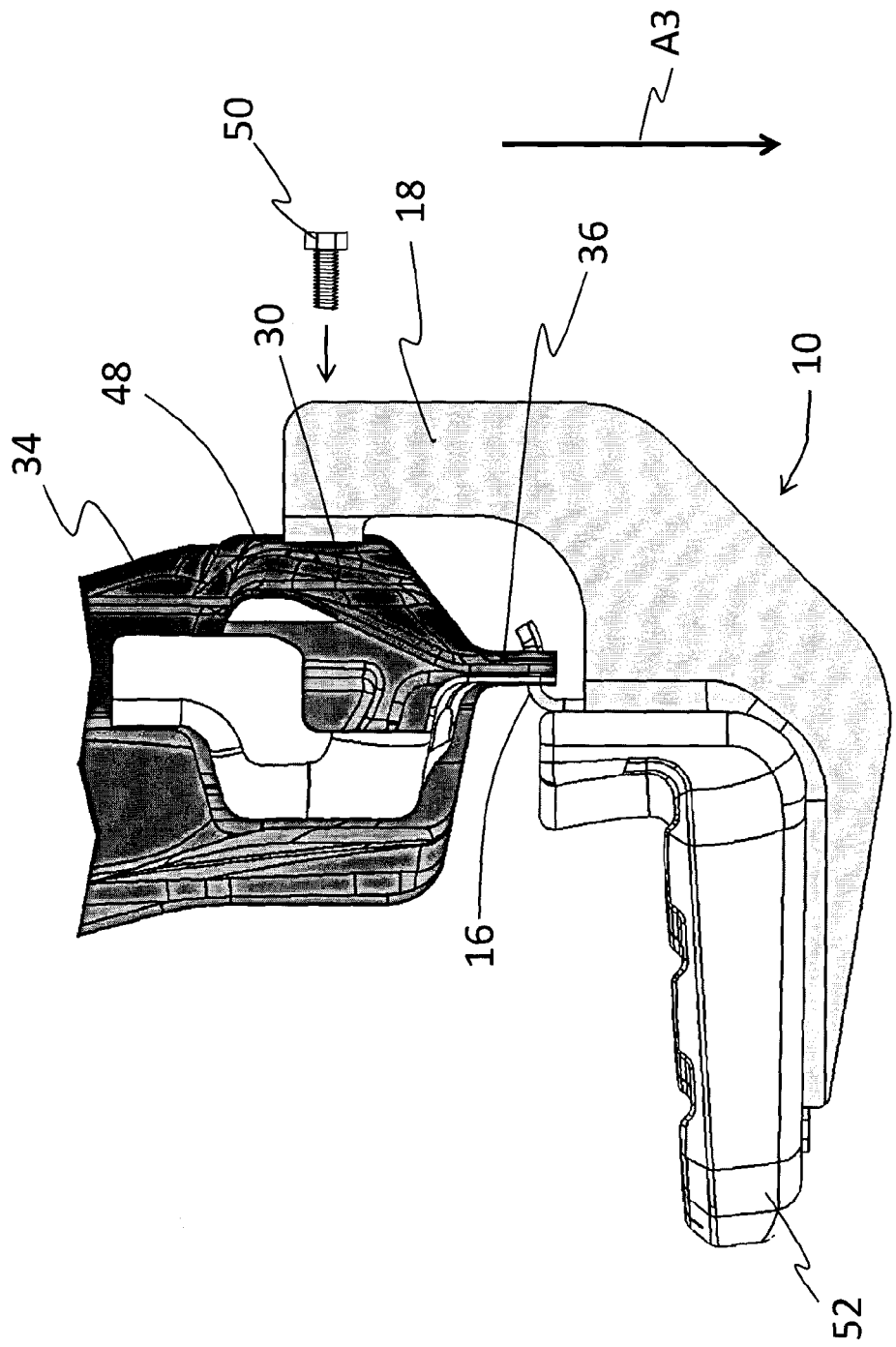

The installation of bracket 10 on a vehicle is shown in the sequence of drawings provided in FIGS. 3a through 3d. In FIG. 3a, bracket 10 is shown in the initial installation position, with interlock structure 16 aligned with the interlock aperture provided on lower flange 36 of structural panel 34 (for details on interlock aperture 38, refer to FIG. 2). Bracket 10 is shifted in the direction of arrow A1 to move the T-shaped extension of interlock structure 16 through installation opening 40 of interlock aperture 38, to the position shown in FIG. 3b. Bracket 10 is then rotated in the direction of arrow A2 until mount element 30 of extension arm 18 aligns and contacts a rear surface 48 of structural panel 34, as shown in FIG. 3c. Bracket 10 is then moved in the direction of arrow A3, to the final position as shown in FIG. 3d. Once in this final installation position, fasteners 50 can be inserted through apertures provided in mount element 30 to lock bracket 10 in position. In this arrangement, bracket 10 is pivotable about interlock structure 16 to facilitate this insertion process.

Figure 5:
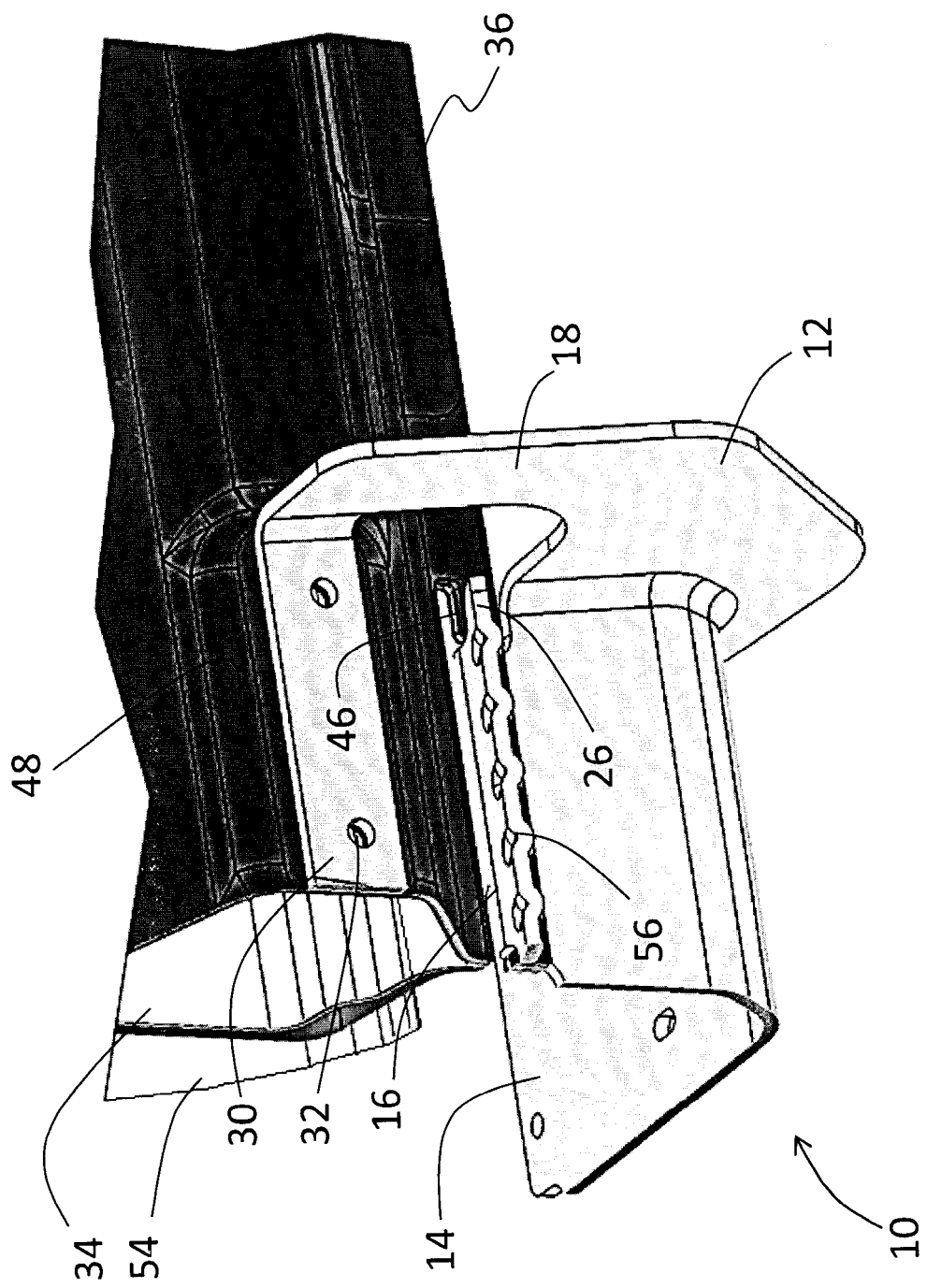
FIG. 5 is a rear perspective view of the bracket of FIG. 1a installed on a vehicle.
Figure 6:
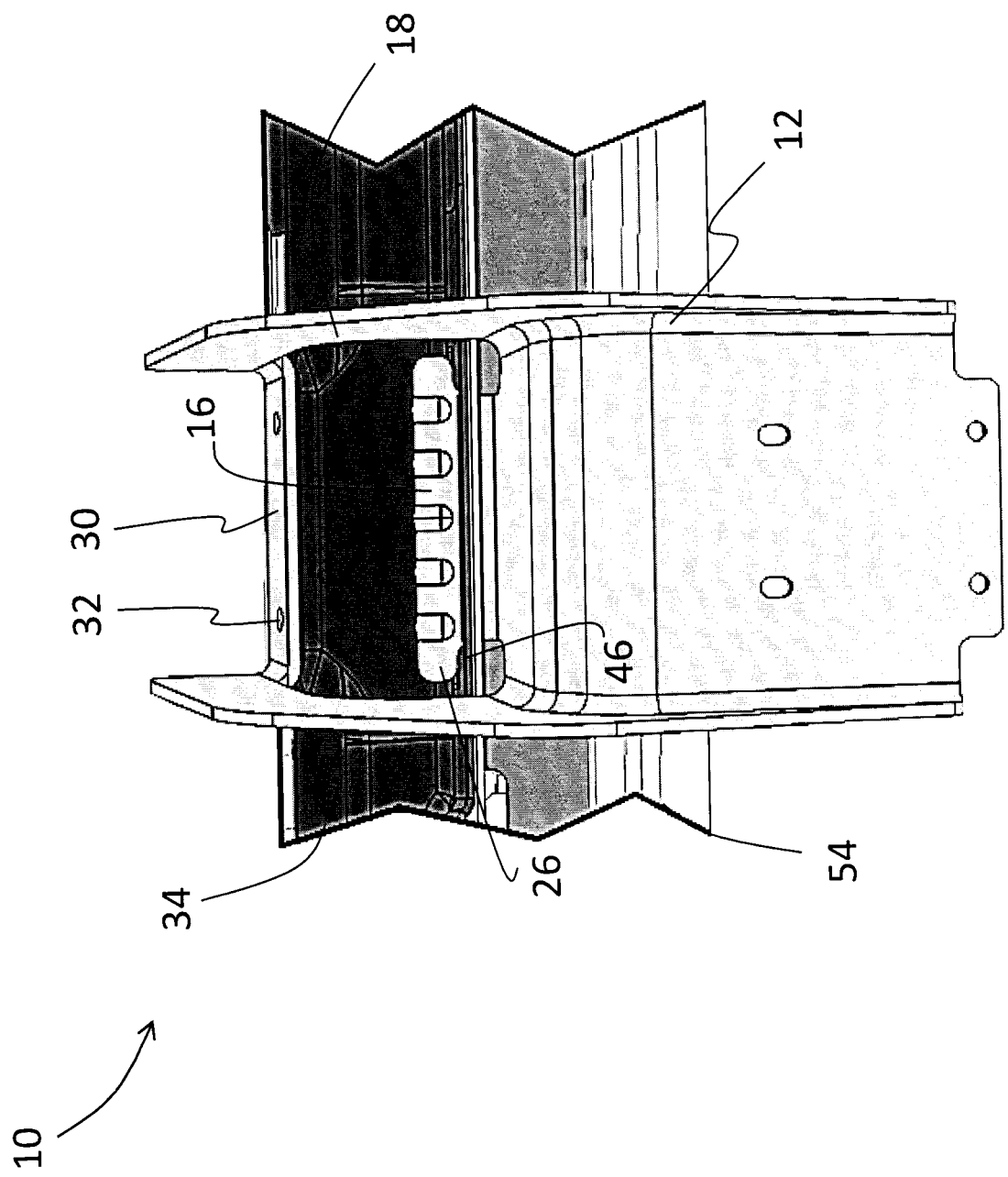
FIG. 6 is a bottom view of the bracket of FIG. 1a installed on a vehicle.
Figure 7:
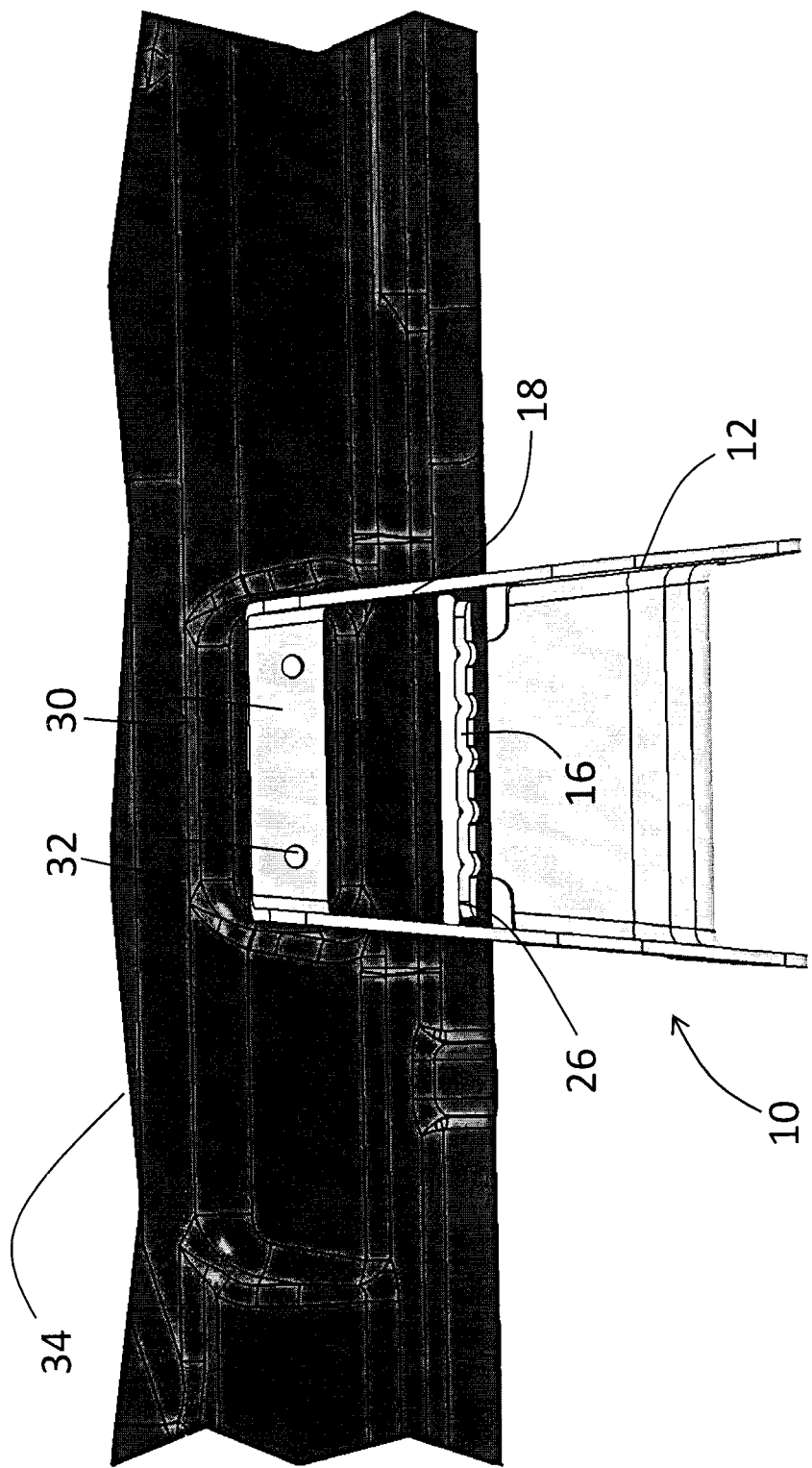
FIG. 7 is a rear view of the bracket of FIG. 1a installed on a vehicle.
Figure 8:
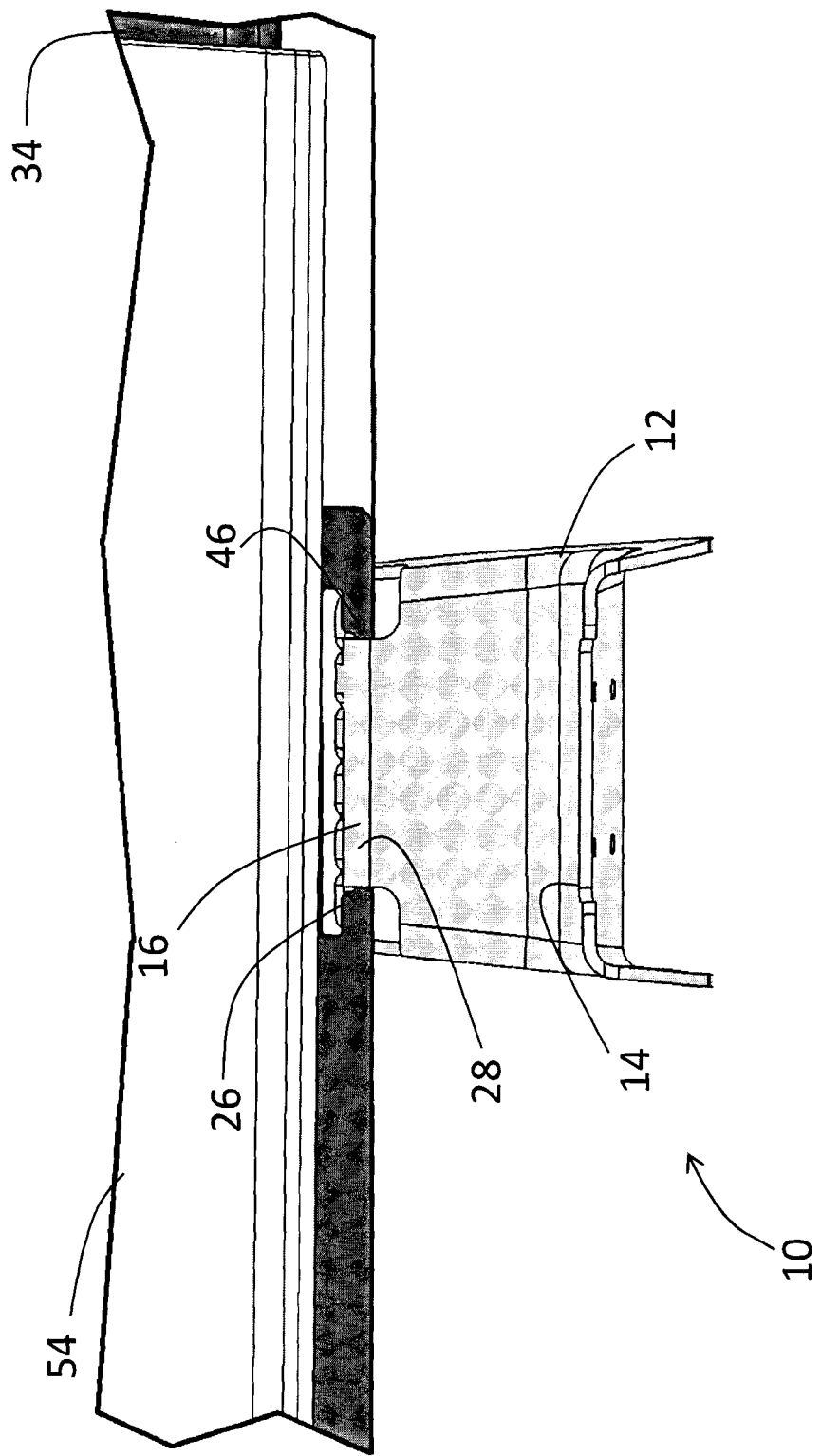
FIG. 8 is a front view of the bracket of FIG. 1a installed on a vehicle.

FIGS. 4 through 8 provide additional views of bracket 10 in the final installed position. Additionally shown in these figures is door 54. FIG. 4 presents a front perspective view which illustrates the position of interlock structure 16 of bracket 10 relative to interlock aperture 38 of lower flange 36. As shown, stem 28 of interlock structure 16 is located against seat 44, and as better illustrated in FIG. 5, engagement wings 26 of interlock structure 16 engage the rear surface of interlock shoulders 46, thereby preventing interlock structure 16 from displacing away from lower flange 36. This locking relationship between interlock structure 16 and interlock aperture 38 is additionally detailed in FIGS. 6 to 8, where FIG. 6 presents a bottom view, FIG. 7 presents a rear view, and FIG. 8 presents a front view of the bracket installed on a vehicle.

FIG. 5 also shows the position of mount element 30 on rear surface 48 of structural panel 34. In this installed position, by driving suitable fasteners through apertures 32 in mount element 30 into rear surface 48 of structural panel 34, bracket 10 cannot be displaced upwards, thereby preventing interlock structure 16 of bracket 10 from displacing away from lower flange 36.

In FIGS. 3a to 3d, the installation of bracket 10 is shown with running board 52 previously mounted on bracket 10. This is one mounting option, where brackets 10 are first attached to running board 52, and the entire running board assembly with brackets 10 is mounted to the vehicle. Alternatively, brackets 10 may be mounted first, with running board 52 mounted in a subsequent step. For example, brackets 10 may be mounted on the vehicle by the vehicle manufacturer, with running board 52 later added to the vehicle by the running board manufacturer.

Figure 9:
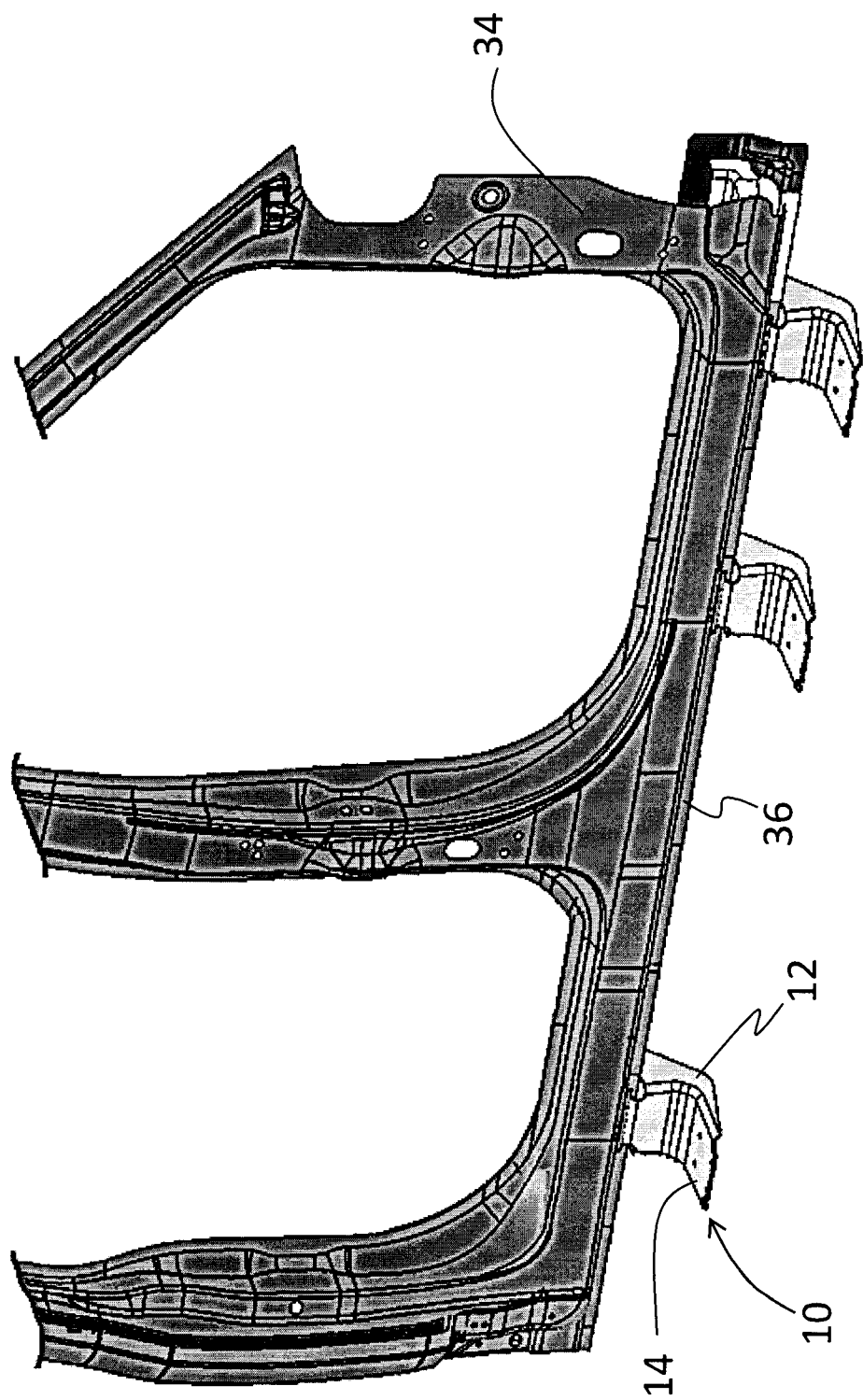
FIG. 9 is a front view of the structural panel of a vehicle showing an exemplary placement of the brackets for a running board installation.

Shown in FIG. 9 is an exemplary installation of brackets 10 on a structural panel 34 of a vehicle. As shown, three brackets 10 are installed to support a running board (not shown). As will be appreciated, the number of brackets used to support a running board will depend on desired performance characteristics, and the overall dimensions of the vehicle and running board structure. For example, in a truck installation, regular cab trucks will generally use two brackets 10 to support the running board. In an extended cab or crew cab format, three or more brackets 10 may be implemented.

Bracket 10 is generally manufactured of a suitable metal, such as aluminum or steel. Bracket 10 may be additionally treated with corrosion inhibitors, or a polymeric sealant. In some embodiments, bracket 10 may be formed using a structural composite of polymeric material, with suitable strength characteristics to meet the desired performance criteria.

As noted in the Figures, interlock structure 16 is generally a T-shaped extension, having a pair of engagement wings 26 on opposite sides of central stem 28. It will be appreciated that a number of other configurations for interlock structure may be utilized. The intention of interlock structure 16 is to provide a mechanical engagement without the need to drive fasteners into lower flange 36. The T-shaped extension is one feasible design, but other interlocking designs may be suitably implemented. In addition, interlock structure 16 may include surface features to facilitate installation, to enhance the interlock function, as well as to provide added strength to interlock structure 16. As shown, interlock structure 16 includes a series of ridges 56.

On extension arm 18, bracket 10 is shown to be fastened to rear surface 48 of structural panel 34 using fasteners 50. Suitable fasteners 50 include threaded fasteners, rivets, and equivalents thereof. It will be appreciated that in some embodiments, bracket 10 may be fastened to rear surface 48 of structural panel 34 using metallurgic bonding process, such as welding. In some embodiments, a combination of fasteners 50 and metallurgic bonding may be used.

Bracket 10 as described herein provides a number of advantages over prior bracket systems. The incorporation of interlock structure 16 reduces the number of fasteners used to mount bracket 10 on a vehicle, thereby reducing labour and materials associated with installation. In this configuration, fastener 50 used on extension arm 18 generally serves two functions, that is first, to securely fix extension arm 18 to rear surface 48 of structural panel 34, and second, to lock bracket 10 in the down position, preventing interlock structure 16 from displacing from interlock aperture 38. In addition, during the assembly process, bracket 10 can be suspended on lower flange 36 by way of interlock structure 16, making it easier for the installer to locate bracket 10 in the proper position.

Running boards suitable for use with the above-described bracket 10 may be constructed using a variety of materials, including but not limited to metals, thermoplastics, composite materials, and combinations thereof. Exemplary suitable thermoplastic materials include polypropylene, thermoplastic polyolefins (TPO), acrylonitrate-butadiene-styrene (ABS), polycarbonate (PC), polybutadiene terephthalate (PBT), polyethylene terephthalate (PET), nylon, polyvinyl chloride (PVC), polystyrene (PS), polyethylene (PPE), and blends of the above materials with other suitable materials (e.g. fillers including, but not limited to glass fibres, talk, etc.).

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A bracket for mounting a running board to a vehicle, the bracket comprising:
    a main body comprising a support surface, an interlock structure and a mount element,
    wherein said support surface provides a surface for supporting the running board,
        wherein said interlock structure is generally a T-shaped extension that extends from said support surface, the T-shaped extension being configured to be inserted through a corresponding interlock aperture on a lower flange of the vehicle to provide a mechanical engagement with an inboard side of the lower flange of the vehicle, and
        wherein said mount element cooperates with a fastener for fastening the bracket to a structural panel of the vehicle.

2. The bracket of claim 1, wherein said T-shaped extension includes a pair of engagement wings on opposing sides of a central stem, said pair of engagement wings of said T-shaped extension being configured to contact and to mechanically lock with the inboard side of the corresponding interlock aperture on the lower flange of the vehicle.

3. The bracket of claim 2, wherein said bracket is pivotable about said interlock structure to facilitate insertion of said T-shaped extension through the corresponding interlock aperture on the lower flange of the vehicle.

4. The bracket of claim 1, wherein said main body is L-shaped, and wherein said support surface forms a first portion of said L-shaped main body, an extension arm forms a second portion of said L-shaped main body, and said interlock structure is located generally in a transition portion between said first and second portions of said L-shaped main body.

5. The bracket of claim 4, wherein said mount element is provided on said extension arm.

6. The bracket of claim 1, wherein said support surface is provided with at least one aperture through which a suitable fastener is used to fasten the running board to the bracket.

7. The bracket of claim 1, wherein said mount element is provided with at least one aperture for cooperating with said fastener to fasten the bracket to the vehicle.

8. The bracket of claim 1, wherein the main body further comprises a support wall adjacent said support surface to provide additional support to the running board when the running board is affixed thereto.

9. A running board assembly for use on a motor vehicle, the running board assembly comprising:
    a running board; and
    at least one bracket mounted to said running board, said bracket configured for mounting said running board to the motor vehicle, said bracket comprising,
        a main body comprising a support surface, an interlock structure and a mount element,
            wherein said support surface provides a surface for supporting said running board,
            wherein said interlock structure is generally a T-shaped extension that extends from said support surface, the T-shaped extension being configured to be inserted through a corresponding interlock aperture on a lower flange of the motor vehicle to provide a mechanical engagement with an inboard side of the lower flange of the motor vehicle, and
            wherein said mount element is configured to enable fastening of said bracket to a structural panel of the motor vehicle.

10. The running board assembly of claim 9, wherein said T-shaped extension includes a pair of engagement wings on opposing sides of a central stem, said pair of engagement wings of said T-shaped extension being configured to contact and to mechanically lock with the inboard side of the corresponding interlock aperture on the lower flange of the motor vehicle.

11. The running board assembly of claim 10, wherein said bracket is pivotable about said interlock structure to facilitate insertion of said T-shaped extension through the corresponding interlock aperture on the lower flange of the motor vehicle.

12. The running board assembly of claim 9, wherein said main body is L-shaped, and wherein said support surface forms a first portion of said L-shaped main body, an extension arm forms a second portion of said L-shaped main body, and said interlock structure is located generally in a transition portion between said first and second portions of said L-shaped main body.

13. The running board assembly of claim 9, wherein said running board is made of a thermoplastic material.

14. A bracket for mounting a running board to a vehicle, the bracket comprising:
    a main body comprising a support surface, an interlock structure and a mount element,
        wherein said support surface provides a surface for supporting the running board,
        wherein said interlock structure extends in an opposite direction from said support surface and is configured to be inserted through a corresponding interlock aperture on a lower flange of the vehicle to provide a mechanical engagement with an inboard side of the lower flange of the vehicle, and wherein said mount element is configured to enable fastening of said bracket to a structural panel of the vehicle.

15. The bracket of claim 14, wherein said mount element of the bracket is fastened to the structural panel of the vehicle using metallurgic bonding.

16. The bracket of claim 14, wherein said main body is L-shaped, and wherein said support surface forms a first portion of said L-shaped main body, an extension arm forms a second portion of said L-shaped main body, and said interlock structure is located generally in a transition portion between said first and second portions of said L-shaped main body.

17. The bracket of claim 16, wherein said mount element is provided on said extension arm.

18. The bracket of claim 14, wherein said support surface is provided with at least one aperture through which a suitable fastener is used to fasten the running board to the bracket.

19. The bracket of claim 14, wherein said mount element is provided with at least one aperture for cooperating with a suitable fastener to fasten the bracket to the vehicle.

20. The bracket of claim 14, wherein the main body further comprises a support wall adjacent said support surface to provide additional support to the running board when the running board is affixed thereto.

* * * * *